United States Patent [19]

Chu et al.

[11] Patent Number: 5,232,601
[45] Date of Patent: Aug. 3, 1993

[54] HIGH FLUX HOLLOW FIBER MEMBRANE

[75] Inventors: Chaokang Chu, Lexington; Bernard S. Liang; Ann L. Ly, both of Bedford, all of Mass.

[73] Assignee: W. R. Grace & Co.-Conn., New York, N.Y.

[21] Appl. No.: 891,308

[22] Filed: May 29, 1992

[51] Int. Cl.⁵ .............................................. B01D 61/28
[52] U.S. Cl. ................................ 210/646; 210/321.8; 210/500.23; 210/500.41
[58] Field of Search ..................... 210/646, 651, 321.8, 210/500.23, 500.41; 264/41, 49, 209.1

[56] References Cited

U.S. PATENT DOCUMENTS 4,720,343 1/1988 Walch et al. ............... 210/500.42 X
4,906,375 3/1990 Heilmann ..................... 210/500.23

Primary Examiner—Frank Spear
Attorney, Agent, or Firm—Margit Maus; William L. Baker

[57] ABSTRACT

A morphologically heterogeneous, hydrophobic polysulfone hollow fiber membrane comprising a spongelike dense inner surface permeable to molecules of less than or equal to 30,000 Daltons, said inner surface having a fraction surface porosity from about 70 to about 80%; and an outer surface having large pores ranging from about 6 to about 16 μm in diameter and small pores less than 500Å in diameter and a fractional surface porosity from about 20 to about 30%; a method for producing same and a hemodialysis treatment method and apparatus incorporating same.

22 Claims, 4 Drawing Sheets

FIG.5

HIGH FLUX HOLLOW FIBER MEMBRANE

BACKGROUND OF THE INVENTION

The present invention relates in general to hollow fiber membranes and specifically to polysulfone ultrafiltration hollow fiber membranes useful for hemodialysis.

The membrane art may be divided into microfiltration, ultrafiltration and dialysis. Each of these categories involves specific criteria and hence skills as evidenced by the following basic differentiation. Microfiltration may be defined as the separation of particles; ultrafiltration as the separation of molecules, primarily macromolecules; and dialysis as the separation of molecules in the ionic range. Thus it is a general objective of the present invention to overcome the specific problems encountered by the dialysis membrane art as enumerated below.

Dialysis primarily involves the migration of molecules across the membrane by diffusion processes governed by a concentration gradient. In hemodialysis, diffusion is passive and molecules are transferred from a region of high concentration to a region of lower concentration. The rate of movement of each molecular species is called its clearance. Clearance is directly proportional to the concentration gradient, diffusion constant of the molecule, temperature, thickness of the membrane and area of the membrane exposed to the fluid. In simple terms, the larger the concentration gradient, the smaller and more spherical the molecule, the higher the temperature, the thinner the membrane and the greater the membrane area exposed, the more rapidly the molecules move, i.e. the higher the clearance. Accordingly, it is a primary objective of the present invention to produce a high flux membrane taking into consideration the aforementioned criteria.

Hyrodynamic flow, the bulk movement of the fluid through a porous medium, is an additional factor to be considered in membrane filtration. In simple terms, the rate of flow of fluid through a porous membrane is directly proportional to the permeability or porosity of the medium, the pressure difference across the membrane, and inversely proportional to the viscosity of the fluid. Thus, the greater the porosity, the greater the pressure difference, and the less viscous the fluid the greater the flow. The present invention again successfully addresses these criteria in a novel and elegant manner.

A further prior art perceived problem to be overcome is fouling. Fouling is the buildup of material on the surface of the membrane which leads to clogging of the pores and hence decreased permeability.

Still a further obstacle to be overcome is concentration polarization, the concentration of a solute near the membrane surface. Increased solute concentration decreases flow rate.

In addition to the aforementioned problems, numerous additional problems are encountered in the kidney dialysis arena. The synthetic membrane art attempts to approximate the natural kidney ultrafiltration of the blood through the glomerular capillaries to remove waste products. The flow through the dialyzer units must be speedy to minimize concentration polarization but no so speedy as to cause denaturation of lysis of the blood components.

The prior art has attempted to solve the aforementioned inherent problems in various novel ways with varying degrees of success. Thus, for instance, flow rates have been increased by the arrival of anisotropic membranes, which have in contrast to earlier isotropic membranes, unequal pore openings on both sides or surfaces of the membrane. Rates were further increased by the advent of hollow fiber membranes which provide for a large filtration area per unit volume and efficient laminar flow to reduce concentration polarization effects.

To assure biocompatibility, most hemodialysis membranes are made of cellulose, however, synthetic membranes are available. Polysulfone membranes are highly biocompatible and have as such been employed in the filtration industry. However, primarily only in the microfiltration industry which as previously outlined deals with a much different set of problems than the ultrafiltration industry and more specifically the hemodialysis industry. While not to be construed to be a comprehensive survey of the art, the following patents are nevertheless considered illustrative of the polysulfone membrane art.

U.S. Pat. No. 4,906,375 issued to Fresenius discloses: "An asymmetric microporous wettable hollow fiber, consisting essentially of an inner barrier layer and an outer foam-like supporting structure said fiber comprising a hydrophobic first organic polymer in an amount equal to 90 to 99% by weight and 10 to 1% by weight of polyvinyl pyrrolidone which is produced by the following steps:

a) wet spinning a polymer solution made up of a solvent, of 12 to 20% by weight of the first said polymer and 2 to 10% by weight of the polyvinyl pyrrolidone, said solution having a viscosity of 500 to 3,000 cps, through a ring duct of a spinnerette having an external ring duct and an internal hollow core, b) simultaneously passing through said hollow internal core a precipitant solution comprising an aprotic solvent in conjunction with at least 25% by weight of a non solvent which acts in an outward direction on the polymer solution after issuing from the spinneret, c) casting into an aqueous washing bath, said spinerette and the upper surface of said washing bath being separated by an air gap, said air gap being to provided that full precipitation of components will have occurred before the precipitated polymer solution enters said washing bath thereby, d) dissolving out and washing away a substantial portion of the polyvinyl pyrrolidone and of the said solvent, to form a fiber having a high clearance rate according to DIN 58352, of 200-290 ml/min for urea and 200-250 ml/min for creatinine and phosphate, at a blood flow rate of 300 ml/min, for fibers having 1.25 $m^2$ of active surface."

While this membrane has a high level of hydraulic permeability, and does not incur an oxygen decrease, it leaches polyvinyl pyrrolidine (PVP) which makes it less biocompatible. Morphologically speaking, the membrane has a uniform microporous barrier layer which has a pore diameter of 0.1 to 2 microns.

HEMOFLOW by Fresenius AG is a sponge-like membrane having micropores of about 6,000 Å diameter on its outer surface and 500 Å diameter pores on its inner surface.

U.S. Pat. No. 4,874,522 issued to Okamoto discloses: "A hollow fiber membrane comprising a polysulfone hollow fiber having on its inner surface a dense skin layer having no pores observable even with a scanning electron microscope (SEM) of magnification of 10,000 on its outer surface microporoes having an average pore diameter of 500 to 5000 Å at a fractional surface porosity of 5 to 50%, and a microporous structure inside said membrane, said membrane exhibiting properties which render it suitable for filtering body fluids and having permeabilities of serum albumin and inuline of not more than 10% and not less than 50% respectively, and a water permeability of not less than 60 ml/mm Hg.m$^2$Hr.

Notably, the hollow fiber structure of this invention is a sponge-like structure having substantially no large cavities.

Given the aforementioned criteria and disadvantages of the prior art, the task of the present invention can be simply stated to provide a novel ultrafiltration hollow fiber membrane which more closely approximates actual kidney filtration by taking into consideration all the heretofore mentioned criteria and specifically providing for a mechanically strong biocompatible, i.e. no leaching; high flux, high solute clearance, decreased leukopenia, apoxia and cell lysis, and decreased pyrogen admittance.

BRIEF DESCRIPTION OF THE INVENTION

In accordance with the present invention, this task is accomplished in an efficient and elegant manner by providing for a morphologically heterogenous, hydrophobic polysulfone hollow fiber membrane comprising a sponge-like dense inner surface permeable to molecules of less than or equal to 30,000 Daltons, said inner surface having a fractional surface porosity from about 70 to about 80%; and an outer surface having large pore sizes ranging from about 6 to about 16 μm in diameter and small pore sizes less than 500 Å in diameter and a fractional porosity ranging from about 20 to about 30%.

BRIEF DESCRIPTION OF THE DRAWINGS

FIG. 5 is a planar microscopic photograph at 111,300 magnification depicting the less than 500 | small outer membrane pores.

DETAILED DESCRIPTION OF THE INVENTION

Figure 1:
FIG. 1 is a cross-sectional electron microscopic photograph (magnification 111,300×) showing the morphologic heterogeneity of the inner and outer surface of the hollow fiber membrane of the present invention.

In addition of the aforementioned general criteria, the Association for the Advancement of Medical Instrumentation developed the American National Standard for First Use Hemodialyzers in the purification of the blood by diffusion and convection between the blood and a solution of chemicals through a semi-permeable membrane. It set labeling and documentation requirements, performance requirement, mechanical/structural integrity requirements, device cleanliness requirements and requirements for materials.

Performance requirements incorporated ultrafiltration rate, solute clearance, pressure drop across the hemodialyzer, blood compartment volume and compliance, and residual blood volume. The ultrafiltration rate may not vary by more than ±20% of the stated value. Solute clearance may not vary by more than ±10%.

The pressure drop across the hemodialyzer value and the blood compartment volume must be initially determined and again after two hours of perfusion if the drop of volume varies by more than ±10% during the interval. The residual blood volume is determined after rinsing the hemodialyzer and after perfusing the blood compartment with blood at a hamatocrit of 25%. The residual volume is to be determined initially and after four hours of perfusion, if the pressure drop across the hemodialyzer varies by more than ±10% during this interval.

Mechanically and/or structurally, hemodialyzers randomly selected from production models which have passed all safety and quality control tests, must withstand 1.5 times the maximum recommended positive operating pressure and a negative pressure which is 1.5 times the recommended negative pressure, or 700 mm Hg, whichever is less. The membrane must further be tested for blood leaks and shipping and storage induced structural defects.

The hemodialyzer blood pathway must be sterile and non-pyrogenic. If ethylene oxide is the sterilant, ethylene oxide residue in the blood pathway may not exceed federal limits. The dialyzer material contacting the blood of dialysate must not interact physically or chemically so as to significantly alter the safety or integrity of the blood or the dialysate.

The present invention simply stated complies with the aforementioned general membrane performance parameters and specific hemodialysis requirements to provide a novel and useful hemodialysis high flux ultrafiltration membrane. The novel hollow fiber membranes of the present invention are to be used in dialyzers. While dialyzers are very well known in the art, a standard dialyzer comprises, in simple terms, a housing with four parts. Two parts communicate with a blood compartment and two with a dialysate compartment. The hollow fiber membrane separates the two compartments. Specifically, blood flows into a chamber at one end of the housing, and then enters thousands of hollow fiber membranes tightly bound into a bundle. While blood flows through the fibers, dialysis solution flows around the outside of the fibers. Once the blood flows through the fibers, the blood collects in a chamber at the opposite end of the cylindrical housing where it is returned to the patient. The present invention offers a time efficient way to detoxify a patient's blood in compliance with the safety, performance, and structural requirements set forth by the Association for the Advancement of Medical Instrumentation.

The task is solved by providing for a morphologically heterogenous, hydrophobic polysulfone hollow fiber membrane comprising a sponge-like dense inner surface permeable to molecules of less than or equal to 30,000 Daltons, said inner surface having a fractional surface porosity from about 70 to about 80%; and an outer surface having large pores ranging from about 6 to about 16 μm in diameter and small pores less than 500

Å, in diameter and a fractional surface porosity ranging from about 20 to about 30%.

Figure 2:
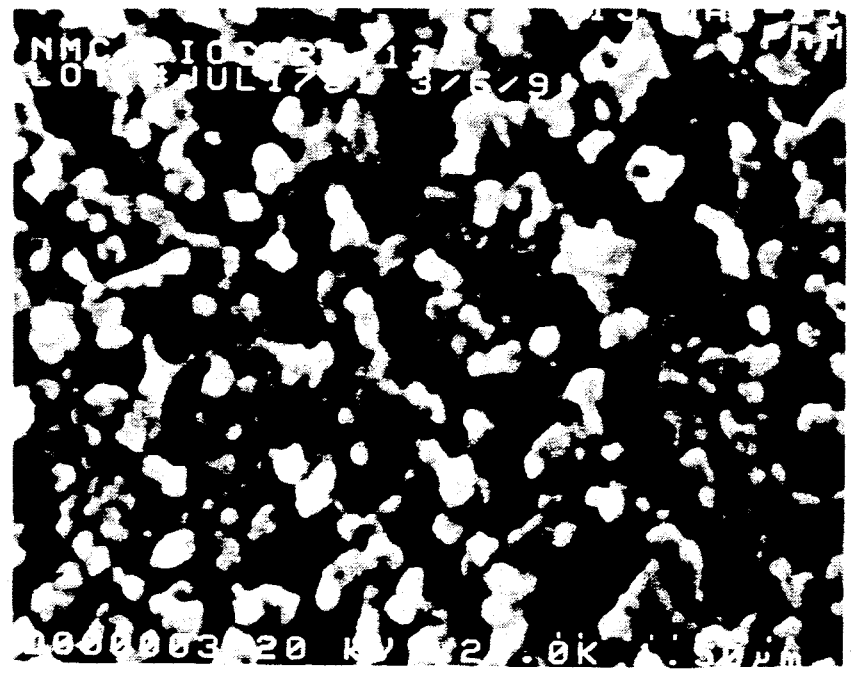
FIG. 2 is a cross-sectional electron microscopic photograph at 20,000 magnification depicting the outer surface pores ranging from 6-16 μm.
Figure 3:
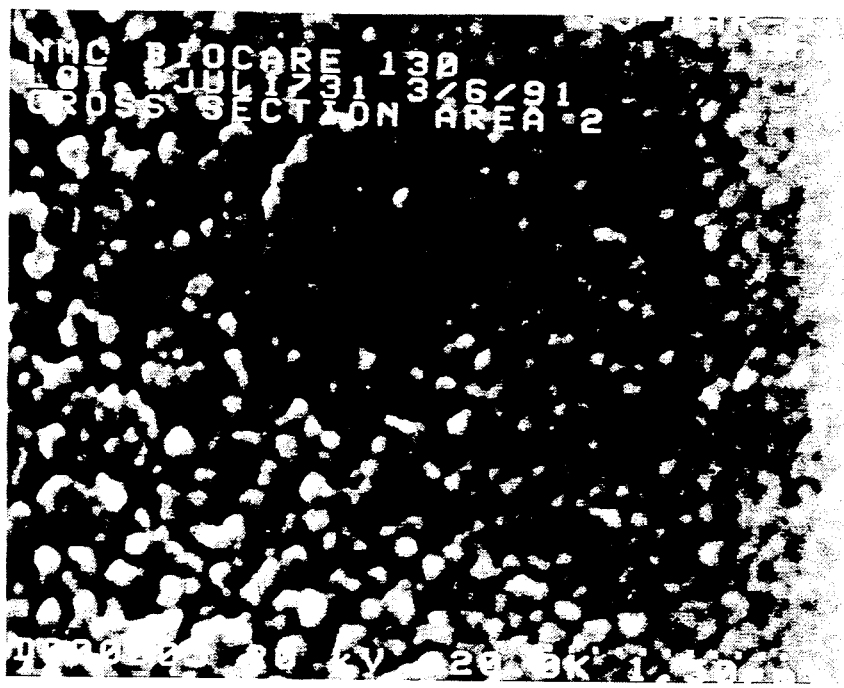
FIG. 3 is a cross-sectional electron microscopic photograph at 20,000 magnification depicting the inner surface sponge-like structure.

FIGS. 1-5 clearly depict the membrane's novel morphology. FIG. 1 is an electron micrograph, magnification 2,000×, illustrating a cross-sectional view of the outer and inner surface of the membrane. Areas A and B are respectively depicted in FIGS. 2 and 3 at a greater magnification, namely 20,000×. FIG. 2 demonstrates a strikingly uniform large pore size distribution. FIG. 3 offers a view of a dense sponge-like pore structure present on the inner surface of the membrane. The specific pore size is not discernible by presently available electron microscope magnifications. However, permeability was measured via molecular weight filtration which showed the dense sponge-like structure to have a molecular weight permeability of up to and including 30,000 Daltons.

In addition to the various pores, FIG. 1 depicts finger-like projections also referred to as large cavities or macrovoids, which are located between the two membrane surfaces yet do not extend therethrough.

Figure 4:
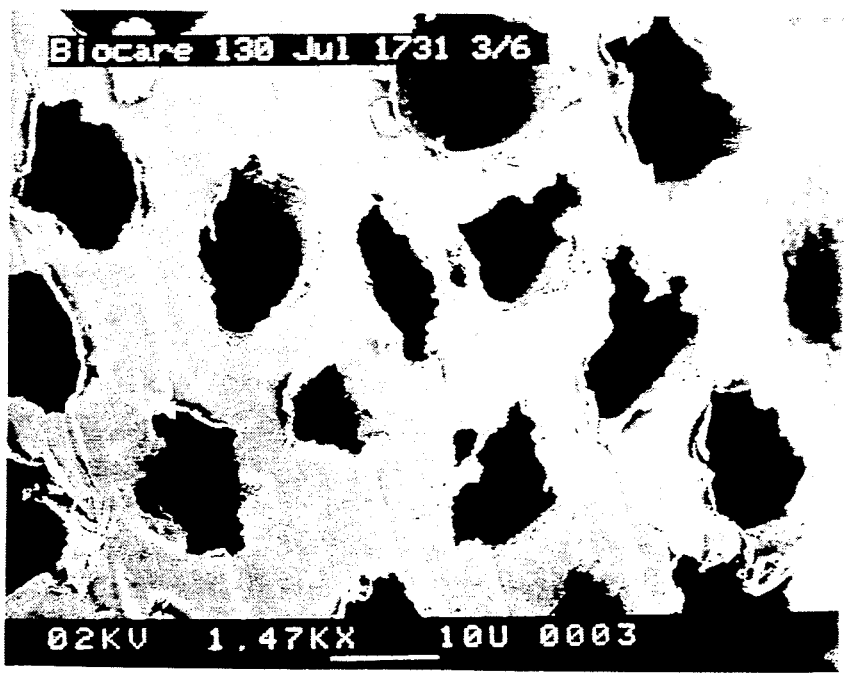
FIG. 4 is a planar electron microscopic photograph at 14,700 magnification of the outer membrane surface.
Figure 5:
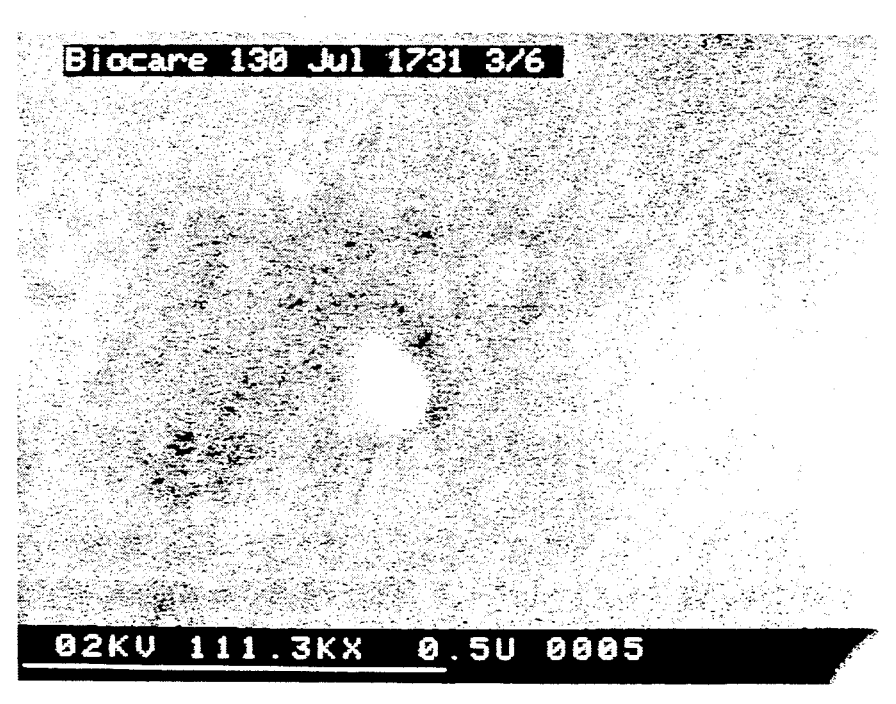

FIG. 4 offers a planar view of the outer membrane surface at a magnification of 14,700×. While the larger pores are readily discernible, smaller pores; i.e., ones less than 500 Å, however, are also present. They are more clearly discerned in FIG. 5 which offers 111,300× magnification.

Since hemodialysis is dependent on selective permeability, having multiple pore sizes which allow for transport of particular molecular weight blood components is highly advantageous. In addition, being able to product uniform distributions of varying pore sizes is likewise advantageous. Thus, it is postulated that the aforementioned novel morphology is responsible for the membrane's high flux and high small solute clearances as well as removal of a wide range of molecular weight toxins.

Figure 6:
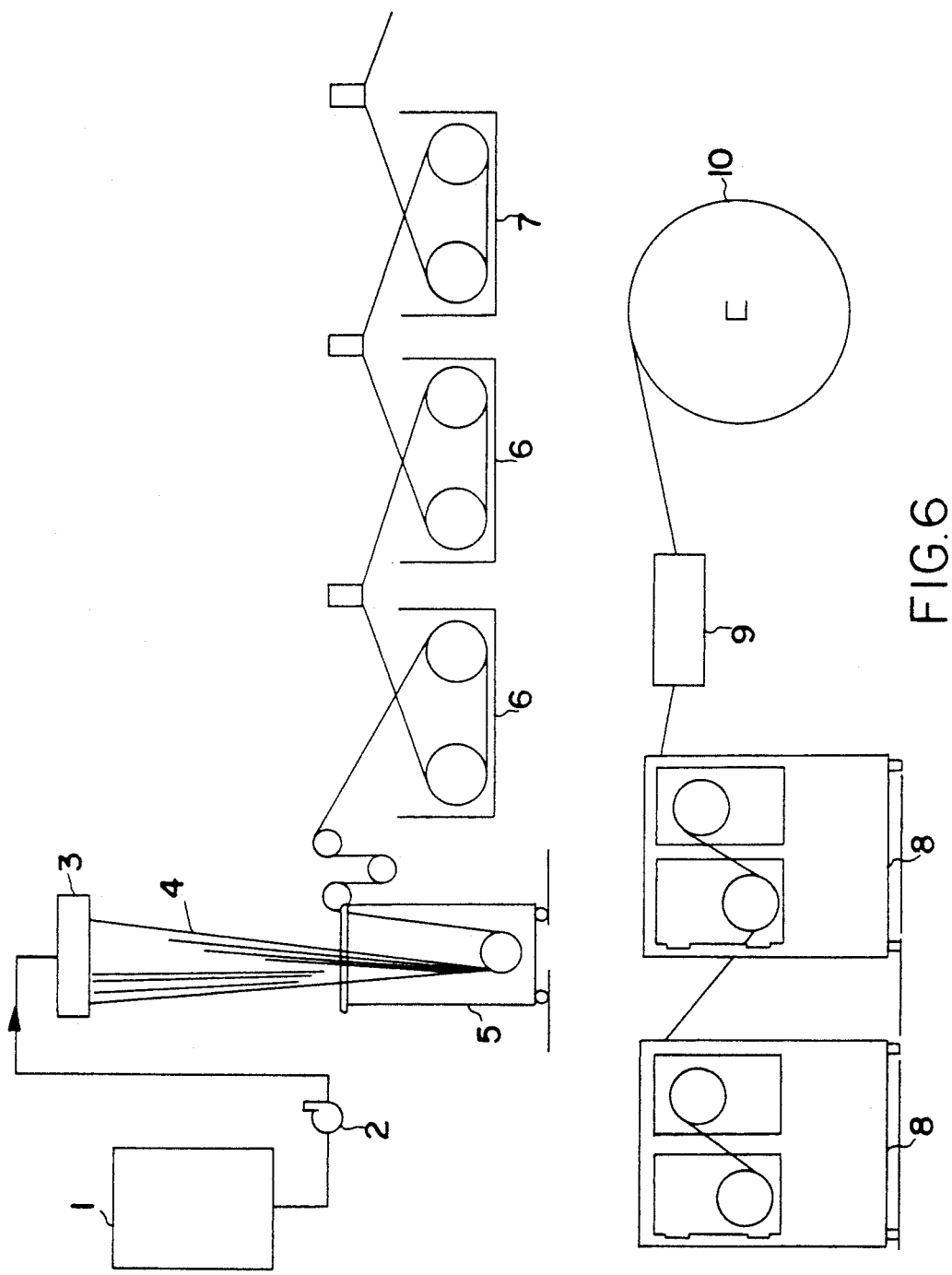
FIG. 6 is a schematic depiction of the hollow fiber manufacturing process.

The present membrane is produced by a dry jet wet spinning process using phase inversion. Specifically, the membrane process involves the following steps as depicted in FIG. 6:

1. Casting solution preparation
2. Fiber spinning
3. Coagulation
4. Washing
5. Glycerinization
6. Drying
7. Texturizing (optional)
8. Collecting the fibers The casting solution preparation involves dissolving polysulfone in a suitable solvent with a compatible polymer to form a spinning dope and/or casting solution. By way of illustration and not limitation, suitable solvents are Di-methylformamide, dimethylacetamide, 4-Butyrolactone and N-methyl pyrrolidone. N-methyl pyrrolidone being particularly preferred.

Again by way of illustration and not limitation mention may be made of polypropylene oxide, polyvinyl pyrrolidone, and polyethylene glycol having a molecular weight ranging from about 200 to about 30,000; polyethylene glycol molecular weight 600 being particularly preferred for the compatible polymer.

The casting and/or dope solution is prepared by mixing 15-30% by weight of polysulfone, 30-65% by weight of solvent and 20-50% by weight of compatible polymer.

The following example of a casting solution show by way of illustration and not by way of limitation the practice of this invention.

EXAMPLE I

| Ingredient | % By Weight |
|---|---|
| Polysulfone | 21% |
| N-Methyl pyrrolidone | 39% |
| Polyethylene glycol 600 | 40% |

The thus formed casting solution and a coagulant solution comprising 70-100% water and 0-30% N-Methyl pyrrolidone, preferably 100% water, is added to the introducing container (1), depicted in FIG. 6, and is pumped via pump (2) to a spinnerette (3) having a double bore nozzle. The casting solution is then pumped to the outer bore and the coagulant solution is pumped to the inner bore.

Next, the fibers (4) are spun. The main variables which need to be controlled to obtain a consistent fiber are:

1. Dope composition
2. Dope viscosity
3. Spinning temperature
4. Dope pumping rate
5. Composition of the coagulants
6. Spinnerette distance from the coagulant bath
7. Interior medium flow rate
8. Coagulation temperature
9. Fiber draw rate The following fiber spinning conditions need to be followed to arrive at the novel features of the present invention:

| | |
|---|---|
| 1. Casting solution viscosity @ 45° C. | 7,000-11,000 cps |
| 2. Spin temperature | 30-80° C. |
| 3. Dope pump rate per fiber | 0.5-1.25 ml/min |
| 4. Spinnerette distance from coagulation bath | 10-70 inches |
| 5. Interior medium flow rate (water) per fiber | 0.5-1.25 ml/min |
| 6. Coagulation temperature | 15-50° C. |
| 7. Fiber draw rate | 20-300 ft./min. |

Under these spin conditions, the non-solvent replaces the solvent at such a rate as to leave the heterogenous surface morphology depicted in FIG. 1.

After the fibers are spun in accordance with the aforementioned parameters, the fibers are collected into bundles and immersed in a quench bath or coagulation bath (5) of water ranging from about 25° to about 40° C. After the quench bath the fiber bundles are placed in a wash bath (6) from about 20° to about 80° C. for about 10-20 minutes to remove excess solvents, etc. Thereafter, the fiber bundles are immersed in a glycerinization bath (7) to fill the pores of the fiber membrane wall with a hydrophilic solution fluid so as to enhance pore wetting. Excess fluid is thereafter removed via drying by ovens (8). If the fibers are to be texturized, which is preferable, they are placed in a texturizing apparatus (9) which imparts a wave-like pattern onto the fibers. Lastly, the texturized fibers are collected on a take-off wheel (10).

The fibers formed via the aforementioned process yield fiber dimensions of 180-220 microns I.D. (Internal Diameter) and a wall thickness of 30-60 microns. The thus produced fibers may be characterized as having high small solute clearance, high flux and enhanced biocompatibility. The latter was determined by the lack of acute systemic leukopenia and change in C3a in effluent blood at 10 minutes' dialysis time when evaluated in a dialyzer comprising the novel hollow fiber membranes having 1.3 m² surface area.

Clinical safety was further tested by introducing abnormally high levels; i.e. 12,5000 EU/ml of pyrogens, endotoxins, into the dialysate solution and measuring their concentration in the blood and dialysate at 0, 1.5, 3 and 24 hrs. Table I illustrates that an insignificant amount of endotoxins entered the blood in 3 hrs. It may therefore be inferred that no pyrogen was admitted during the three-hour period, an amount of time which is approximately equivalent to the usual hemodialysis session.

TABLE I $Q_{B-in} = 300$ ml/min: $Q_{D-in} = 500$ ml/min

| Time (Hrs) | Blood Side | Endotoxin Level (EU/ml) Dialysate Side |
|---|---|---|
| 0 | 40 | 25,000* |
| 1.5 | 12.5 | 25,000* |
| 3 | 12.5 | 12,500 |
| 24 | 625 | 12,500 |

*Elevated reading due to detection methodolgy.

It is hypothesized that the pyrogen admittance is decreased by the hydrophobicity of the membrane which adsorbs pyrogens. This adsorption in turn prevents an immune reaction making the membrane more biocompatible.

The hydrophobic nature of the present invention has still a further advantage in that it causes blood proteins to coat the membrane surface thereby deceasing the likelihood of an auto-immune response to the synthetic membrane material by turning, in simple terms, a synthetic foreign object into a body part. The prior art refers to the adherence of proteins as fouling; i.e., a coating of the membrane surface and clogging of the membrane pores. The prior art as previously mentioned, views this as a disadvantage to be overcome since the protein adherence decreases diffusion.

The present invention, in contrast, promotes coating of the membrane surface, while at the same time preventing clogging of the pores and there decreased diffusion. The pores are not clogged due to the limited permeability of the membrane, namely, less than or equal to 30,000 Daltons.

Thus, contrary to the prior art, the present invention advantageously provides for protein coating and hence biocompatibility without significantly affecting the diffusive properties of the membrane.

Six prototype dialyzers, ethylene oxide sterilized, were studied in six stable and consenting chronic dialysis patients while undergoing hemodialysis. The dialyzer was found to be high flux with a $Q_U = 27.6$ (transmembrane pressure-34.3)mL/hr/mm Hg.r=0.833. The relationship of UF,$Q_B$,RB,$Q_U$ and hematocrit (Hct) were such that at $Q_B = 300$ mL/min, the minimum $Q_U$ required to prevent back filtration at any point in the dialyzer was 358 mL/hr at Hct 25% and 1089 mL/hr at Hct 35%. Notably the $Q_U$ values represent the minimum required to prevent back filtration.

When standardized at T=1.5 hrs., $Q_U = 15$ mL/min, $Q_D = 500$ mL/min and Hct 30%, the mean small solute whole blood clearances derived from Ro/A (membrane resistance/total surface area) values in mL/min. were:

TABLE II

| | BUN | | CREAT | | PO4 | |
|---|---|---|---|---|---|---|
| $Q_B$ | Mean | Range* | Mean | Range* | Mean | Range* |
| 200 | 163 | 160–180 | 152 | 150–165 | 139 | 135–160 |
| 300 | 201 | 200–240 | 186 | 180–200 | 172 | 160–180 |
| 400 | 226 | 220–265 | 211 | 200–220 | 199 | 185–210 |
| 500 | 249 | 240–295 | 233 | 220–260 | 225 | 210–230 |

*Range values connote raw clinical data and do not reflect standardization.

After 10 minutes of membrane exposure to blood, the systemic mean white blood cell count fell 13.7±4.0% and the mean plasma C3a changed from 447±205 to 397±387 ng/ml, mean % change −21.1±56.7%. C3a increased in only one patient between systemic predialysis blood and effluent blood at 10 minutes and decreased in five patients.

Clearances measured in vitro using aqueous solution at QB=300 ml/min, QD=500 ml/min, QF=10 ml/min and a temperature of 37° C. are illustrated in Table III.

TABLE III

| Urea | 246 ml/min |
|---|---|
| Creatinine | 226 ml/min |
| Phosphate | 211 ml/min |
| Vitamin B₁₂ | 165 ml/min |

The ultrafiltration rate measured in vitro using bovine whole blood at QB=300 ml/min, Hct 32% and membrane mechanical characteristics are listed in Table IV.

TABLE IV

| Effective Surface Area | 1.3 m² |
|---|---|
| Wall Thickness | 35μ |
| Inside Diameter | 200μ |
| Fiber Length | 26 cm |
| Ultrafiltration | 38 ml/hr/mmHg |

From the foregoing description, including the test data, it is evident that the present invention provides for useful hollow fiber membranes having high flux, high biocompatibility, high hydraulic permeability and high small solute clearance characteristics.

Since certain changes may be made without departing from the scope of the invention as described herein, it is intended that all matter described in the foregoing specification, including the examples, shall be interpreted as illustrative and not in a limiting sense.

What is claimed is:

1. A morphologically heterogenous, hydrophobic polysulfone hollow fiber membrane comprising a sponge-like dense inner surface permeable to molecules of less than or equal to 30,000 Daltons, said inner surface having a fractional surface porosity from about 70 to about 80%; and an outer surface having large pore sizes ranging from about 6 to about 16 μm in diameter and small pore sizes less than 500 † in diameter and a fractional surface porosity ranging from about 20 to about 30%.

2. The membrane described in claim 1, further comprising finger-like projections inbetween said inner and outer surface.

3. The membrane described in claim 1, having an ultrafiltration constant ranging from about 30 to about 55 mL/hr/mmHg.

4. The membrane described in claim 1, having a BUN clearance from about 160 to about 295 mL/min.

5. The membrane described in claim 1, having a creatinine clearance from about 150 to about 260 mL/min.

6. The membrane described in claim 1, having a $PO_4$ clearance ranging from about 135 to 230 mL/min.

7. A process for manufacturing a heterogenous, hydrophobic polysulfone hollow fiber, comprising the steps of:
   a) mixing:
      i. 15–30% by weight polysulfone,
      ii. 30–65% by weight solvent, and
      iii. 20–50% by weight compatible polymer to form a casting solution;
   b) pumping said casting solution and a coagulant solution through separate bores of a spinnerette to form fibers;
   c) dry-jet-wet spinning said fibers;
   d) submerging said fibers in a coagulation bath, a wash bath to remove excess solvents, and a glycerinization bath;
   e) drying said fibers to remove excess fluid.

8. The process described in claim 7, wherein the casting solution has a viscosity ranging from about 7,000 to about 11,000 cps at 45° C.

9. The process described in claim 7, wherein the coagulant solution is 70–100% water and 0–30% solvent.

10. The process described in claim 7, wherein the fibers are dry-jet-wet spun at 30°–80° C.

11. The process described in claim 7, wherein the fibers are dry-jet-wet spun at a draw rate of 20–300 ft/min.

12. The process described in claim 7, wherein the coagulation bath temperature ranges from about 15° to about 50° C.

13. The process described in claim 7, wherein the wash bath temperature ranges from about 20° to about 80° C.

14. The process described in claim 7, wherein the spinnerette is positioned 10–70 inches from the coagulation bath.

15. The process described in claim 7, wherein the solvent is selected from the group consisting of Dimethylformamide, di-methylacetamide, 4-Butyrolactone and N-methyl pyrrolidone.

16. The process described in claim 14, wherein the solvent is N-methyl pyrrolidone.

17. The process described in claim 7, wherein the compatible polymer is selected from the group consisting of polypropylene oxide, polyvinyl pyrrolidone, and polyethylene glycol having a molecular weight ranging from about 200 to about 30,000.

18. The process described in claim 17, wherein the compatible polymer is polyethylene glycol 600.

19. A method for detoxifying human blood by filtering said blood through a dialyzer comprising a morphologically heterogenous, hydrophobic polysulfone hollow fiber membrane comprising a sponge-like dense inner surface permeable to molecules of less than or equal to 30,000 Daltons, said inner surface having a fractional surface porosity from about 70 to about 80%; and an outer surface having a large pore sizes ranging from about 6 to about 16 $\mu$m in diameter and small pore sizes less than 500Å in diameter and a fractional surface porosity ranging from about 20 to about 30%.

20. The method described in claim 19 wherein the inner membrane surface is coated with a thin layer of blood proteins.

21. A dialyzer comprising means for filtering body fluid prepared by forming a bundle of morphologically heterogenous, hydrophobic polysulfone hollow fiber membranes each comprising a sponge-like dense inner surface permeable to molecules of less than or equal to 30,000 Daltons, said inner surface having a fractional surface porosity from about 70 to about 80%; and an outer surface having large pore sizes ranging from about 6 to abut 16 $\mu$m in diameter and small pore sizes less than 500Å in diameter and a fractional surface porosity ranging from about 20 to about 30%; and fixing both ends of said bundle in a housing comprising an inlet and an outlet for transmitting blood through the fibers and dialysis solution around the outside of the fibers.

22. A morphologically heterogenous polysulfone hollow fiber membrane produced by the process comprising the steps of:
   a) mixing:
      i. 15–30% by weight polysulfone,
      ii. 30–65% by weight solvent, and
      iii. 20–50% by weight compatible polymer to form a casting solution.
   b) pumping said casting solution and a coagulant solution through separate bores of a spinnerette to form fibers;
   c) dry-jet-wet spinning said fibers;
   d) submerging said fibers in a coagulation bath, a wash bath to remove excess solvents, and a glycerinization bath;
   e) drying said fibers to remove excess fluid.

* * * * *